US008031358B2

(12) United States Patent
Tokimatsu

(10) Patent No.: US 8,031,358 B2
(45) Date of Patent: Oct. 4, 2011

(54) IMAGE FORMING SYSTEM INCLUDING A PLURALITY OF IMAGE FORMING APPARATUSES

(75) Inventor: Hiroyuki Tokimatsu, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 12/787,530

(22) Filed: May 26, 2010

(65) Prior Publication Data

US 2010/0231972 A1 Sep. 16, 2010

Related U.S. Application Data

(63) Continuation of application No. 10/784,205, filed on Feb. 24, 2004, now abandoned.

(30) Foreign Application Priority Data

Jun. 20, 2003 (JP) .................................. 2003-175818

(51) Int. Cl.
*G06F 3/12* (2006.01)
*G03G 15/00* (2006.01)
(52) U.S. Cl. ............ 358/1.15; 358/1.14; 399/24; 399/27
(58) Field of Classification Search .................. 358/1.15, 358/1.14; 399/27, 8, 299, 24, 26, 29
See application file for complete search history.

(56) References Cited

U.S. PATENT DOCUMENTS

| 5,694,156 | A | * | 12/1997 | Hoisington et al. ............... 347/7 |
| 5,797,061 | A | * | 8/1998 | Overall et al. .................. 399/27 |
| 5,802,420 | A | * | 9/1998 | Garr et al. ....................... 399/27 |
| 5,907,669 | A | | 5/1999 | Yoshiura et al. |
| 6,257,465 | B1 | | 7/2001 | Treadwell |
| 6,348,971 | B2 | | 2/2002 | Owa et al. |
| 6,377,765 | B1 | * | 4/2002 | Shishido et al. ............. 399/113 |
| 6,430,711 | B1 | * | 8/2002 | Sekizawa ..................... 714/47.2 |

(Continued)

FOREIGN PATENT DOCUMENTS

JP 07-261610 10/1995

(Continued)

OTHER PUBLICATIONS

Ishiguro Hisashi, Network System of Image Forming Device, May 11, 2009, JP 11-127290 English Translation.*

(Continued)

*Primary Examiner* — Twyler Haskins
*Assistant Examiner* — Dennis Dicker
(74) *Attorney, Agent, or Firm* — Finnegan, Henderson, Farabow, Garrett & Dunner, L.L.P.

(57) ABSTRACT

An image forming system, having means for storing usage histories of latent image carriers, developer, or the like and maintenance cycles of image forming apparatuses and having a function for selecting image forming apparatuses outputting an image based on the usage history data or the maintenance cycles, in order to achieve uniform output image qualities. By managing the usage histories so as to achieve approximately the same deteriorated conditions of the latent image carriers of the image forming apparatuses, the image forming apparatuses can be put in the same condition and thus the output image qualities can be approximately the same in the image forming apparatuses. Additionally, the maintenance cycles can be adjusted to be approximately the same in the image forming apparatuses. Otherwise, maintenance periods can be controlled so as not to overlap in the image forming apparatuses.

13 Claims, 9 Drawing Sheets

U.S. PATENT DOCUMENTS

| | | | |
|---|---|---|---|
| 6,529,286 B1 * | 3/2003 | King | 358/1.14 |
| 7,031,014 B2 * | 4/2006 | Ohwa | 358/1.18 |
| 7,058,317 B2 * | 6/2006 | Yamazaki | 399/8 |
| 7,061,391 B2 | 6/2006 | Hopper et al. | |
| 7,164,491 B2 * | 1/2007 | Hasegawa | 358/1.18 |
| 7,173,718 B2 | 2/2007 | Iwata et al. | |
| 7,444,088 B2 * | 10/2008 | Radulski et al. | 399/27 |
| 7,574,545 B2 * | 8/2009 | Keeney et al. | 710/220 |
| 7,639,381 B2 * | 12/2009 | Shima | 358/1.15 |
| 7,715,761 B2 * | 5/2010 | Uda et al. | 399/168 |
| 2004/0080773 A1 | 4/2004 | Jamison et al. | |

FOREIGN PATENT DOCUMENTS

| | | |
|---|---|---|
| JP | 10-105008 | 4/1998 |
| JP | 10-240552 | 9/1998 |
| JP | 11-127290 | 5/1999 |
| JP | 2001-083848 | 3/2001 |
| JP | 200-136318 | 5/2001 |
| JP | 2001-249781 | 9/2001 |

OTHER PUBLICATIONS

Mizusawa Hiroshi, Processor Connecting System, Apr. 24, 1998, JP10-105008, English Translation.*

Communication issued by Japanese Patent Office on Feb. 25, 2009 in corresponding Japanese Patent Publication No. 2003-175818, 4 pages.

Communication issued by Japanese Patent Office on Jul. 14, 2009 in corresponding Japanese Patent Publication No. 2003-175818, 3 pages.

* cited by examiner

IMAGE FORMING SYSTEM INCLUDING A PLURALITY OF IMAGE FORMING APPARATUSES

CROSS REFERENCE TO RELATED APPLICATIONS

This is a continuation of application Ser. No. 10/784,205, filed Feb. 24, 2004 now abandoned, the contents of which are incorporated herein by reference, which claims priority to Application No. JP 2003-175818 filed on Jun. 20, 2003 in Japan.

BACKGROUND OF THE INVENTION

1. Field of the Invention

The present invention relates to an image forming system comprising a plurality of image forming apparatuses connected so as to output data or to form image copies from selected ones.

2. Description of the Prior Arts

Recently, with the progress of digitalization and networking of copying machines, printers, and complex machines caused by the advance of highly-networked information technology, a technology of an image forming system capable of obtaining a large number of image copies in a short time has been in practical use. In the image forming system, an original image read from a certain single image reader is copied at a high speed using a plurality of digital copying machines connected to each other or image data transmitted from a computer are output to a plurality of printers at a high speed.

For the image forming system in conventionally practical use, importance is attached to a great volume of and high-speed image output. Therefore, there has been proposed a method of forming an image efficiently by distributing and sharing image output processing (for example, refer to Japanese Unexamined Patent Publication (Kokai) Nos. Hei 9-261395 (1997) and Hei 11-127290 (1999)). On the other hand, there has been proposed a method of correcting differences in image quality among the image forming apparatuses in Japanese Unexamined Patent Publication (Kokai) No. 2001-83848. Furthermore, there has also been proposed a method of analyzing received image data and selecting printers for outputting the image in Japanese Unexamined Patent Publication (Kokai) No. Hei 10-240552 (1998).

To output an image by using a plurality of image forming apparatuses including a number of copying machines, printers, and complex machines connected to each other with the same image quality or with a desired function (image combine staple, folding, etc.), it is important to correct the image quality or to select the function or devices in consideration of the conditions (a material to be used, a frequency in use, individual differences in devices, etc.) of the image forming apparatuses and functional differences between the devices.

The aforementioned conventional image forming system has been proposed on the assumption that the conditions and functions of the image forming apparatuses are equivalent. In other words, it is not considered in the conventional systems that the image forming apparatuses may be different in conditions or functions. Therefore, the conventional system has a problem that it is hard to standardize the image quality or the function in image forming apparatuses different in conditions or functions.

SUMMARY OF THE INVENTION

The present invention has been made in view of the above problem. It is an object of the present invention to provide an image forming system capable of outputting an image by means of a plurality of image forming apparatuses connected to each other, with the same image quality and desired functions applied in consideration of output conditions or functional differences between individual image forming apparatuses.

To resolve the above problem, there is provided an image forming system according to a first aspect of the present invention, comprising communication means for interconnection and a plurality of electrophotographic image forming apparatuses each visualizing a latent image on a latent image carrier generated based on input image data by means of developer and transferring it to a recording material, which are connected via the communication means, the image forming system having means for storing usage histories of the latent image carriers of the image forming apparatuses and having a function of selecting image forming apparatuses outputting the image based on the carrier usage history data stored in the storing means.

The image forming system according to a second aspect of the present invention has a feature that the usage history of the latent image carrier is based on the number of transferred pages obtained with reference to an operating time or recording materials in the first aspect of the invention.

The image forming system according to a third aspect of the present invention has a feature that the usage history of the latent image carrier is modified according to a characteristic of deterioration through use of each latent image carrier in the first or second aspect of the invention.

The image forming system according to a fourth aspect of the present invention has a feature that the image forming apparatuses outputting the image are selected so that the usage histories of the latent image carriers of the image forming apparatuses are approximately the same in one of the first to third aspects of the invention.

According to a fifth aspect of the present invention, there is provided an image forming system, comprising communication means for interconnection and a plurality of electrophotographic image forming apparatuses each visualizing a latent image on a latent image carrier generated based on input image data by means of developer and transferring it to a recording material, which are connected via the communication means, the image forming system having means for storing usage histories of the developer of the image forming apparatuses and having a function of selecting image forming apparatuses outputting the image based on the developer usage history data stored in the storing means.

The image forming system according to a sixth aspect of the present invention has a feature that the usage history of the developer is based on the number of transferred pages obtained with reference to an operating time of a developing device, which contains the developer and supplies it to the latent image carrier, or recording materials in the fifth aspect of the invention.

The image forming system according to a seventh aspect of the present invention has a feature that the usage history of the developer is modified according to a characteristic of deterioration through use of the developer in the fifth or sixth aspect of the invention.

The image forming system according to an eighth aspect of the present invention has a feature that the image forming apparatuses outputting the image are selected so that the usage histories of the developer are approximately the same in the image forming apparatuses in one of the fifth to seventh aspects of the invention.

According to a ninth aspect of the present invention, there is provided an image forming system, comprising communication means for interconnection and a plurality of electrophotographic image forming apparatuses each visualizing a latent image on a latent image carrier generated based on input image data by means of developer and transferring it to a recording material, which are connected via the communication means, the image forming system having means for storing usage histories after maintenance of the image forming apparatuses and having a function of selecting image forming apparatuses outputting the image based on the aforementioned usage history data.

The image forming system according to a 10th aspect of the present invention has a feature that the usage history after maintenance is based on the number of transferred pages obtained with reference to an operating time for image formation of the image forming apparatus or recording materials in the eighth aspect of the invention.

The image forming system according to an 11th aspect of the present invention has a feature that the usage history after maintenance is modified according to a characteristic of deterioration through use of each image forming apparatus in the ninth or 10th aspect of the invention.

The image forming system according to a 12th aspect of the present invention has a feature that the image forming apparatuses outputting the image are selected so that the usage histories after maintenance are approximately the same in the image forming apparatuses in one of the ninth to 11th aspects of the invention.

According to a 13th aspect of the present invention, there is provided an image forming system, comprising communication means for interconnection and a plurality of electrophotographic image forming apparatuses each visualizing a latent image on a latent image carrier generated based on input image data by means of developer and transferring it to a recording material, which are connected via the communication means, the image forming system having means for storing information on average photographic densities of developer after replacement and having a function of selecting image forming apparatuses outputting the image based on the average photographic densities obtained from the information.

The image forming system according to a 14th aspect of the present invention has a feature that the means for storing the information on the average photographic densities includes at least means for storing usage histories of the developer, means for calculating the photographic densities during image formation successively, and means for calculating the average photographic densities from the usage histories and the successively calculated photographic densities in the 13th aspect of the invention.

The image forming system according to a 15th aspect of the present invention has a feature that the image forming apparatuses outputting the image are selected so that the average photographic densities are approximately the same in the image forming apparatuses in the 13th or 14th aspect of the invention.

According to a 16th aspect of the present invention, there is provided an image forming system, comprising communication means for interconnection and a plurality of electrophotographic image forming apparatuses each visualizing a latent image on a latent image carrier generated based on input image data by means of developer and transferring it to a recording material, which are connected via the communication means, the image forming system having means for detecting amounts of remaining developer of the image forming apparatuses and means for calculating a black ratio of the image data and having a function of selecting image forming apparatuses outputting the image based on the remaining developer amount data and the black ratio data.

The image forming system according to a 17th aspect of the present invention has a feature that the image forming apparatuses outputting the image are selected so that the amounts of remaining developer after the image formation are approximately the same in the image forming apparatuses in the 16th aspect of the invention.

The image forming system according to an 18th aspect of the present invention has a feature that the developer contains color particles in one of the first to 17th aspects of the invention.

The image forming system according to a 19th aspect of the present invention has a feature that a part or all of the plurality of image forming apparatuses connected to each other via the communication means are of different models in one of the first to 18th aspects of the invention.

The image forming system according to a 20th aspect of the present invention further comprises a display unit for displaying a list of the image forming apparatuses selected for outputting the image in one of the first to 19th aspects of the invention.

The image forming system according to a 21st aspect of the present invention further comprises an operating unit for giving an instruction to execute the output with specifying a part or all of the image forming apparatuses displayed on the display unit in the 20th aspect of the invention.

The image forming system according to a 22nd aspect of the present invention further comprises a host device control unit for selecting the image forming apparatuses outputting the image based on one of the aforementioned data in one of the first to 21st aspect of the invention.

The image forming system according to a 23rd aspect of the present invention has a feature that the host device control unit is incorporated in at least one of the image forming apparatuses in the 22nd aspect of the invention.

The image forming system according to a 24th aspect of the present invention has a feature that the host device control unit is connected to the image forming apparatuses independently of the image forming apparatuses connected to each other in the 22nd aspect of the invention.

DETAILED DESCRIPTION OF THE PREFERRED EMBODIMENTS

A preferred embodiment of the present invention will now be described in detail hereinafter with reference to the accompanying drawings.

Figure 1:
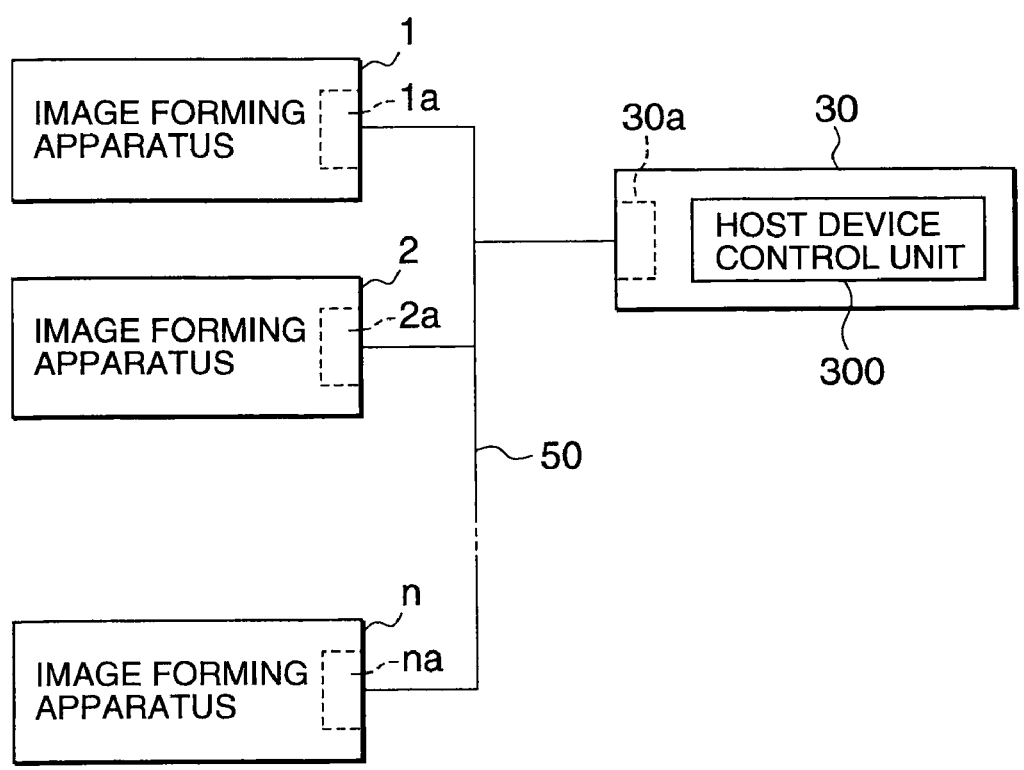
FIG. 1 is a diagram showing a connection of an image forming system according to an embodiment of the present invention.

As shown in FIG. 1, a plurality of image forming apparatuses 1 to n, which are digital complex machines, are connected to each other so that they can output data via LAN interfaces 1a to na included therein, respectively, and a LAN 50, and further the LAN 50 is connected to a host device control computer 30 via a LAN interface 30a in the image forming system. In other words, the LAN interfaces 1a to na are communication means for the image forming apparatuses. In this embodiment, the host device control computer 30 controls the output, and therefore the host device control computer 30 is provided with a host device control unit 300 for the control. The number of image forming apparatuses in the image forming system can be modified appropriately.

Figure 2:
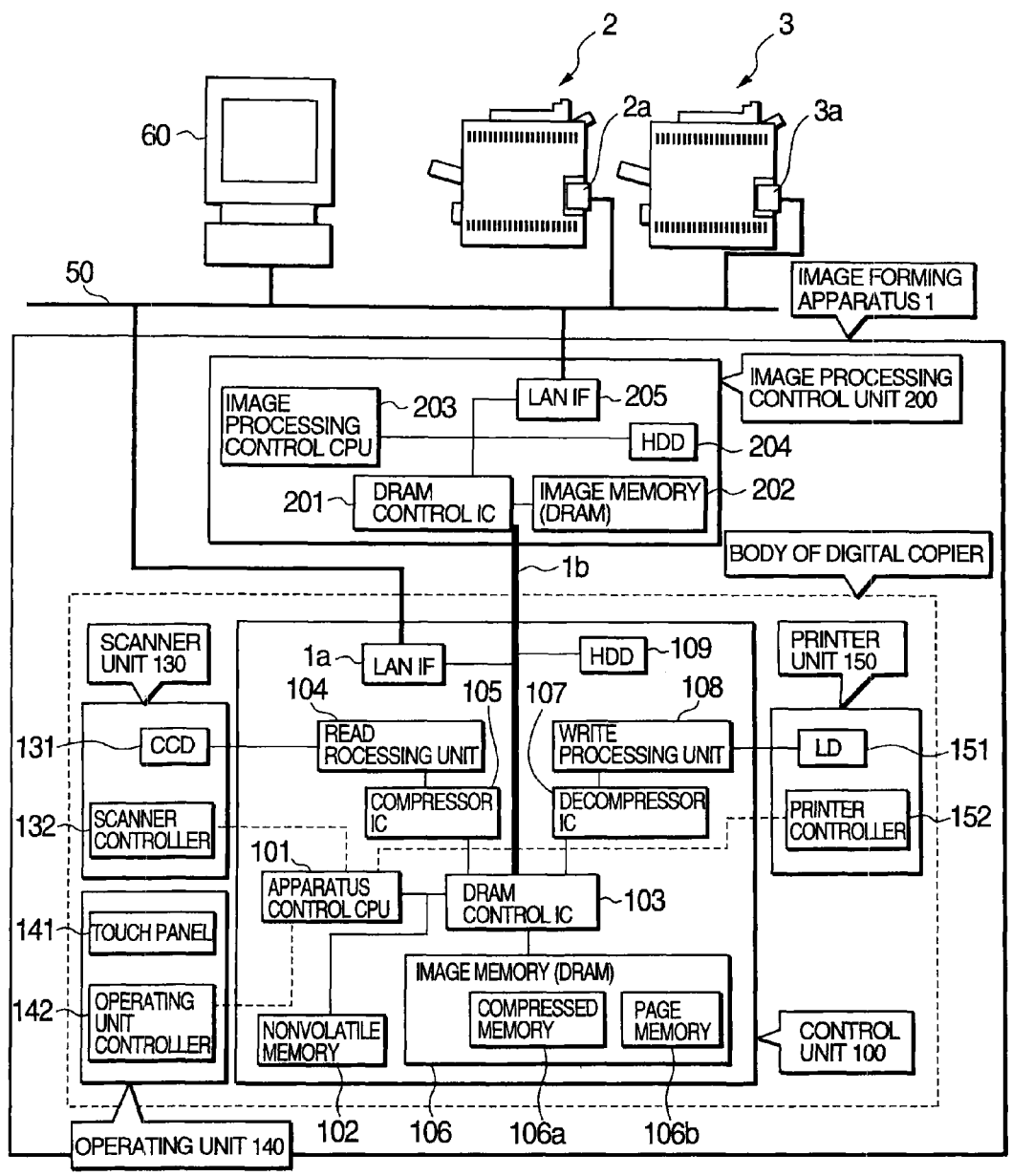
FIG. 2 is a block diagram showing an image forming apparatus according to the embodiment in view of a functional aspect.

As shown in a block diagram of FIG. 2 showing the image forming apparatus 1, each image forming apparatus comprises an image forming apparatus control unit 100 as a body of a digital copier, a scanner unit 130, an operating unit 140, a printer unit 150, and an image processing control unit 200 for processing image data input from an external device via the LAN 50 or for processing image data obtained by the scanner unit 130 so that it can be transferred to the external device. The LAN 50 is connected to a terminal 60 provided as the external device in this embodiment.

The image forming apparatus control unit 100 has the LAN interface 1a connected to the LAN 50 as mentioned above. The LAN interface 1a is connected to a PCI bus 1b for connecting the image forming apparatus control unit 100 to the image processing control unit 200 inside the image forming apparatus 1. In the image forming apparatus control unit 100, the PCI bus 1b is connected to a DRAM control IC 103, and the DRAM control IC 103 is connected to an image memory 106 comprising a compressed memory 106a and a page memory 106b.

The image forming apparatus control unit 100 has an apparatus control CPU 101, and the apparatus control CPU 101 is connected to the DRAM control IC 103. Furthermore, the apparatus control CPU 101 is connected to a nonvolatile memory 102. The nonvolatile memory 102 stores a program for operating the apparatus control CPU 101, print setting information of the image forming apparatus 1, machine setting information, and the like. The apparatus control CPU 101 can read nonvolatile data stored in the nonvolatile memory 102 and can write desired data as nonvolatile data into the nonvolatile memory 102. The apparatus control CPU 101 controls operations of the components of the image forming apparatus 1 according to the print setting information or the machine setting information stored in the nonvolatile memory 102.

The nonvolatile memory 102 can store usage history data of a latent image carrier, usage history data of developer, usage history data after maintenance, remaining developer amount data, and black ratio data described later, which can be read out if necessary. The apparatus control CPU 101 can update history data stored in the nonvolatile memory 102 in continuing a use of the apparatus and can reset the aforementioned usage history data, remaining amount data, and black ratio data due to replacement of the latent image carrier or developer or due to carrying out the maintenance. In addition, the apparatus control CPU 101 can calculate an average black ratio by using the above data and can store the average photographic data into the nonvolatile memory 102. Further, the apparatus control CPU 101 can modify the usage history data according to a characteristic of deterioration through use of the apparatus, and it can previously determine a modification data table or a modification formula for the modification and store it in the nonvolatile memory 102. The apparatus control CPU 101 can modify usage history or other data stored in the nonvolatile memory 102 with modification data whenever referencing it. Furthermore, usage history or other data can be modified with the modification data before storing the usage history or other data into the nonvolatile memory.

Furthermore, the apparatus control CPU 101 can communicate with other image forming apparatuses and the host device control computer 30 via the LAN interface 1a. Therefore, it can transmit or receive image data or image processing instructions to or from these other image forming apparatuses and the host device control computer 30. Still further the device control CPU 101 can send various usage history data, remaining developer amount data, and average black ratio data stored according to a request from the control computer 30 at the time of an output.

Subsequently, the scanner unit 130 has a CCD 131 for performing optical reading and a scanner controller 132 for controlling the entire scanner unit 130. The scanner controller 132 is connected to the control CPU 101 so that serial communications are ensured between them. The CCD 131 is connected to a read processing unit 104 for processing image data read by the CCD 131. The read processing unit 104 is connected to a compressor IC 105 for compressing the image data. The compressor IC 105 is connected to the aforementioned DRAM control IC 103. The scanner unit 130, the read processing unit 104, and the compressor IC 105 form image reading means.

The operating unit 140 comprises a touch panel 141 and an operating unit controller 142, with the touch panel 141 connected to the operating unit controller 142 and with the operating unit controller 142 connected to the device control CPU 101. In the operating unit 140, the touch panel 141 enables inputs of various settings in the image forming apparatus 1, and various information can be displayed if necessary. In other words, the touch panel 141 also serves as a display unit. The information input from the touch panel 141 is sent to the apparatus control CPU 101, which then performs predetermined processing.

Furthermore, the DRAM control IC 103 is connected to a decompressor IC 107 for expanding the compressed image data. The decompressor IC 107 is connected to a write processing unit 108. The write processing unit 108 is connected to a laser diode (LD) 151 of the printer unit 150 and processes data for use in an operation of the LD 151. More specifically, it generates control data for controlling the LD 151 so as to achieve a latent image based on the image data. The printer unit 150 has a printer controller 152 for controlling the entire printer unit 150, and the printer controller 152 is connected to the aforementioned control CPU 101. Details of the printer unit 150 and the like will be described later. The PCI bus 1b is connected to a HDD 109, which is capable of saving image data or the like at user's request.

The PCI bus 1b is also connected to a DRAM control IC 201 of the image processing control unit 200. In the image processing control unit 200, the DRAM control IC 201 is connected to an image memory (DRAM) 202, which is an image storage unit. Furthermore, in the image processing control unit 200, a common bus is connected to the DRAM control IC 201, an image processing control CPU 203, and a LAN interface 205. The LAN interface 205 is connected to the LAN 50. An HDD 204 is provided to store image data or the like as is stored in a nonvolatile storage.

The following describes a basic operation of the image forming apparatus.

A procedure for storing image data in the image forming apparatus 1 will now be described below.

First, it is described that the scanner unit 130 reads an image to generate image data in the image forming apparatus 1. The scanner unit 130 optically reads the image from an original by means of the CCD 131. At that time, the scanner controller 132 that receives an instruction from the apparatus control CPU 101 controls the operation of the CCD 131.

The apparatus control CPU 101 operates according to a program and issues an instruction to the scanner unit 130 on the basis of an operation of the operating unit 140 or of the terminal 60. The image read by the CCD 131 is data-processed in the read processing unit 104, and the data-processed image data is compressed by a predetermined method in the compressor IC 105 and stored in the compressed memory 106a via the DRAM control IC 103.

In other cases, image data is input to the image forming apparatus 1, for example, via the LAN 50 and the LAN interface 205. The above image data is, for example, generated by an application program in the terminal 60. The data is received by the image processing control unit 200 via the LAN interface 205 and stored once in the image memory 202 by means of the DRAM control IC 201. The data in the image memory 202 is further stored once in the page memory 106b via the DRAM control IC 201, a PCI bus 1b, and the DRAM control IC 103. The data stored in the page memory 106b is sequentially sent to the compressor IC 105 via the DRAM control IC 103 and compressed and then stored in the compressed memory 106a via the DRAM control IC 103.

Still further, as another example, image data is transferred via the LAN 50 and stored in the compressed memory 106a via the LAN interface 1a and the DRAM control IC 103 of the image forming apparatus 1. The above image data is, for example, generated by reading an image in image forming apparatuses 2 to n and transmitted via the LAN 50.

After the image data is stored in the compressed memory 106a as mentioned above and if the image forming apparatus 1 is used as a scanner, the image data obtained using the scanner unit 130 is sent to the decompressor IC 107 via the DRAM control IC 103 from the compressed memory 106a and the data is expanded. The expanded data is then sent to the page memory 106b via the DRAM control IC 103 so as to be stored. The data stored in the page memory 106b is stored in the image memory 202 of the image processing control unit 200 via the DRAM control IC 103, the PCI bus 1b, and the DRAM control IC 201 of the image processing control unit 200.

The image data stored in the image memory 202 is transmitted to the terminal 60 or the like via the LAN interface 205 and the LAN 50.

The image data stored in the compressed memory 106a can be transmitted to other image forming apparatuses 2 to 6 via the DRAM control IC 103, the LAN interface 1a, and the LAN 50 according to an instruction from the apparatus control CPU 101. Other image forming apparatuses 2 to n can receive and store the image data and can further perform the image formation.

If the image is output from the image forming apparatus 1, the image data is stored into the compressed memory 106a as mentioned above, and then it is sent from the compressed memory 106a to the decompressor IC 107 via the DRAM control IC 103 to expand the data. Thereafter, the expanded data is sent to the write processing unit 108 to write the data into a latent image carrier (described later) in the LD 151. The printer unit 150 receives an instruction from the apparatus control CPU 101 and the printer controller 152 controls respective units. Thereby, the printer unit 150 makes printing on a predetermined recording sheet (not shown), which is a recording material. Furthermore, if there is provided a post-processing device, which is not shown in FIG. 2, the post-processing device performs required post-processing upon request of given post-processing (punching, stapling, etc.) and discharges the sheet.

Figure 3:
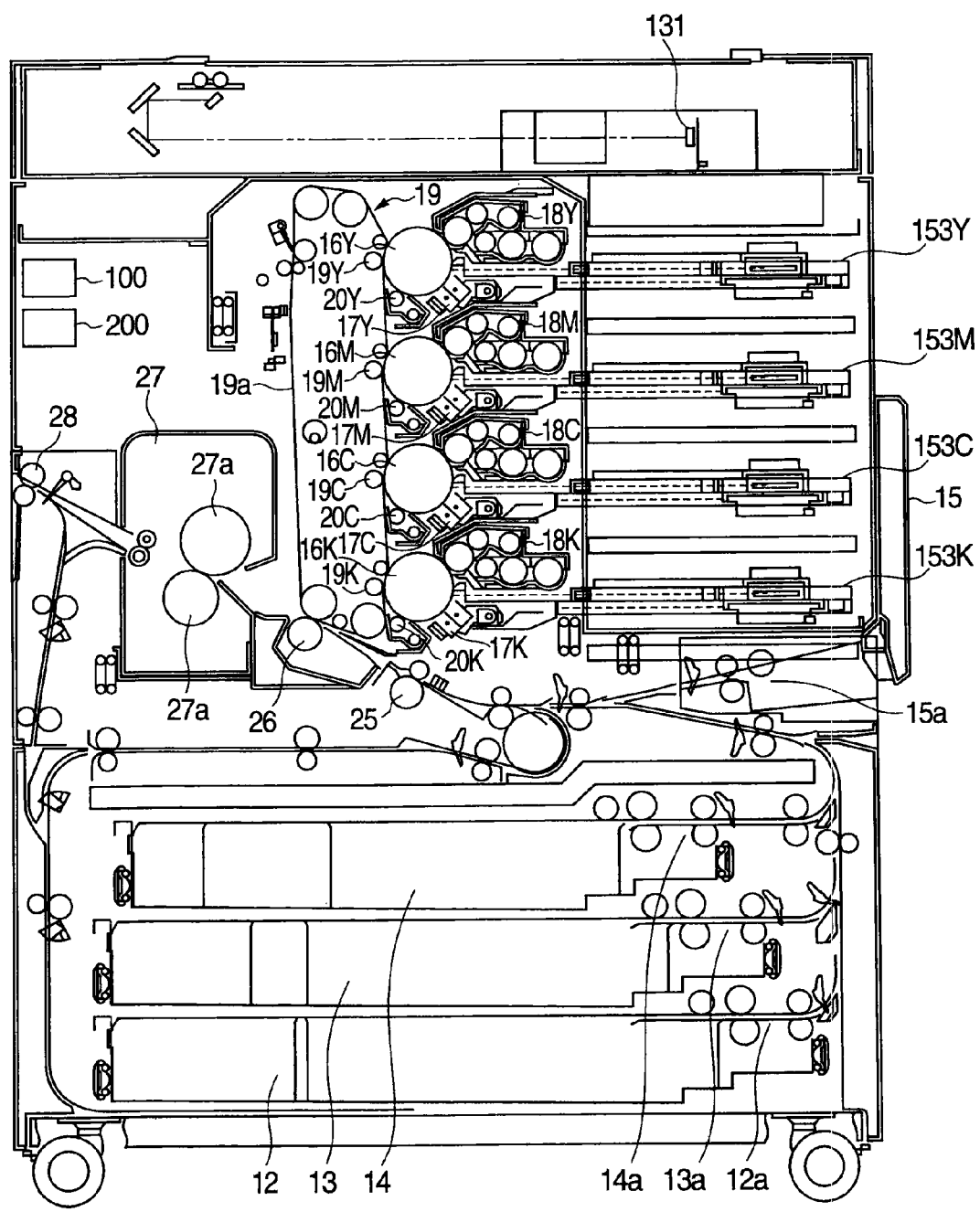
FIG. 3 is a schematic sectional view showing an internal structure of the image forming apparatus according to the embodiment.

Subsequently, the main mechanical structure of the image forming apparatus 1 is described below with reference to FIG. 3, for assistance in explaining an operation of the printer unit 150. In FIG. 3 the same reference numerals have been used as in FIGS. 1 and 2 for similar parts.

The image forming apparatus 1 comprises original writing units 153Y, 153M, 153C, and 153K including an LD 151, photosensitive members 16Y, 16M, 16C, and 16K as latent image carriers, charging means 17Y, 17M, 17C, and 17K, and developing devices 18Y, 18M, 18C, and 18K. Further, it comprises intermediate transfer units 19Y, 19M, 19C, and 19K. The intermediate transfer units 19Y, 19M, 19C, and 19K are wound around a plurality of rollers, respectively, and supported in a rotatable condition. They are provided with an endless-belt type intermediate transfer member 19a arranged so that it can be put in contact with the photosensitive members 16Y, 16M, 16C, and 16K and primary transfer means 19 for transferring an image by putting the intermediate transfer member 19a in contact with the photosensitive members 16Y, 16M, 16C, and 16K. Furthermore, there are arranged cleaning units 20Y, 20M, 20C, and 20K in the vicinity of the photosensitive members 16Y, 16M, 16C, and 16K.

Each of the photosensitive members 16Y, 16M, 16C, and 16K comprises a photosensitive drum and a photosensitive layer formed on its surface layer. They are uniformly charged by the charging means 17Y, 17M, 17C, and 17K and are exposed to light thereafter so as to achieve a latent image formed according to the original image by means of each LD included in the original writing units 153Y, 153M, 153C, and 153K.

The developing devices 18Y, 18M, 18C, and 18K contain developer including yellow, magenta, cyan, and black toners, respectively. Each developing device is formed as a unit, thus the developing device containing the developer is replaced with new one when the developer is exchanged. The developing devices 18Y, 18M, 18C, and 18K are controlled as to operation by the apparatus control CPU 101. The apparatus control CPU 101 can manage their operating time as their usage histories and can store the data into the nonvolatile memory 102. In addition, each developing device is provided with a sensor (not shown) for detecting an amount of remaining developer in the developing device. A result of detecting the amount is sent to the apparatus control CPU 101.

At the top of the image forming apparatus 1, there is provided an original reading unit, which functions as the scanner unit 130. An original is set on its platen having a glass surface and then scanned and read by the original reading unit. The original reading unit contains the CCD 131 for receiving an input of a reflected light obtained by the scanning mentioned above. The original reading unit can be provided with an automatic document feeder (ADF), though it is not shown in this diagram.

At the bottom of the image forming apparatus 1, there are arranged paper feed trays 12, 13, and 14, which are provided with paper feeding means 12a, 13a, and 14a, respectively. In addition, there is provided a manual paper feed tray 15 on a lateral outer wall of the image forming apparatus 1, with paper feeding means 15a for the manual feed tray 15. In this manner, there are provided a plurality of paper feed trays and the manual paper feed tray, and therefore it is possible to use a plurality of kinds of sheets different in size.

At the front of the paper feeding mechanism of the paper feeding means 12a to 15a, there is arranged a registration roller 25. Further ahead of it there is arranged a secondary transfer roller 26 that can push a sheet against the intermediate transfer member 19a. Fixing means 27 is provided ahead of the secondary transfer roller 26, and a paper discharging roller 28 is provided ahead of the fixing means 27. Furthermore, it is also possible to arrange a stapling machine or other output devices, not shown, in the discharging side of the paper discharging roller 28.

In the image forming apparatus 1, the photosensitive members 16Y, 16M, 16C, and 16K are charged by the charging means 17Y, 17M, 17C, and 17K according to an image forming instruction from the apparatus control CPU 101, and a given latent image is formed on the photosensitive members 16Y, 16M, 16C, and 16K according to the image data. The developing means 18Y, 18M, 18C, and 18K supply developer to the photosensitive members 16Y, 16M, 16C, and 16K, by which the latent image is visualized. The primary transfer means 19Y, 19M, 19C, and 19K transfer the image from the photosensitive members 16Y, 16M, 16C, and 16K, where the image has been developed, to the intermediate transfer member 19a. The developer remaining on the photosensitive members 16Y, 16M, 16C, and 16K after the transfer is removed mechanically and electrically by the cleaning units 20Y, 20M, 20C, and 20K, and it is collected into a waste toner unit not shown. If the used developer does not need be classified at collection as in a black-and-white output device, it can be disposed of directly as described above or can be turned into the developing device for reuse.

On the other hand, the sheet as a recording material necessary for the image formation is supplied by the paper feeding means 12a, 13a, 14a, or 15a from one of the paper feed trays 12, 13, and 14 and the manual paper feed tray 15 according to a paper size determined based on printing conditions or the like, and it reaches the secondary transfer roller 26 via the registration roller 25. The secondary transfer roller 26 pushes the sheet against the intermediate transfer member 19a, by which the image on the intermediate transfer member 19a is transferred to the sheet. The sheet having the transferred image takes image fixing processing by the fixing means 27 having a pair of heating rollers 27a, 27a and then discharged to the outside of the image forming apparatus 1 via the paper discharging roller 28. If the apparatus has a postprocessor such as a stapling machine, post-processing is performed if necessary. Upon completion of the image formation with the image forming apparatus, the apparatus control CPU for controlling the image forming apparatus updates the accumulated number of output sheets and the apparatus operating time and stores them in the nonvolatile memory 102.

In the image forming system, the image forming apparatus 1 is connected to the plurality of image forming apparatuses 2 to n via the LAN 50 as shown in FIG. 1. Each of the image forming apparatuses 2 to n comprises a control unit 100 as a body of a digital copier having a configuration equivalent to that of the image forming apparatus 1, a scanner unit 130, an operating unit 140, and an image processing control unit 200.

The host device control computer 30 connected to the LAN 50 has the control unit 300 as mentioned above. The control unit 300 can comprise a CPU not shown and a program for controlling it. The program can be stored in a ROM (not shown) or the like in the control unit 300. The host device control computer 30 can communicate with other image forming apparatuses via the LAN interface 30a, and therefore it can transmit or receive image data or image processing instructions to or from other image forming apparatuses. Furthermore, the control computer 30 can make a request to other image forming apparatuses for transmitting various usage history data, remaining developer amount data, or average black ratio data stored in the image forming apparatuses at the time of output, and it can select output image forming apparatuses according to a predetermined standard based on the above data. A user can also control the contents of the selection after an input of the image data by transmitting it to image forming apparatuses where the user is to input the data and displaying it on a touch panel of the image forming apparatuses.

Figure 4:
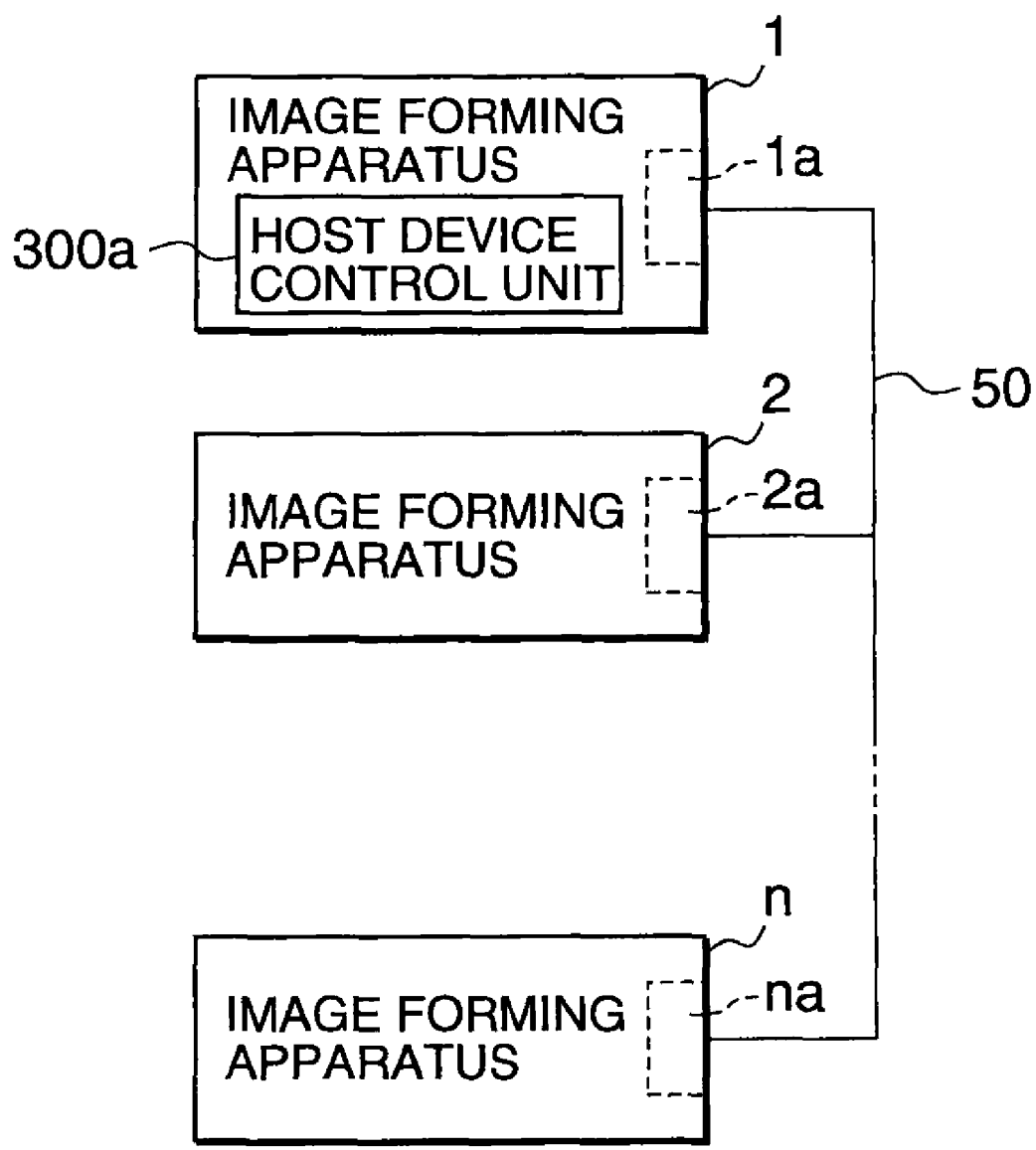
FIG. 4 shows a connection of an image forming system according to another embodiment of the present invention.

While the independent host device control computer 30 is connected separately from the image forming apparatuses and the host device control unit 300 in the host device control computer 30 controls the output in this embodiment as stated above, it is also possible to control the output by means of a host device control unit 300a of a specific or arbitrary image forming apparatus, which is included in the image forming system as shown in FIG. 4. In this condition, the host device control unit 300a can comprise the apparatus control CPU 101 in the image forming apparatus and a program for operating it. It is also possible that the host device control unit 300a having a configuration equivalent to that of the host device control unit 300 is incorporated in the image forming apparatus in the form of a substrate or the like so as to operate.

(Output Procedure 1)

Figure 5:
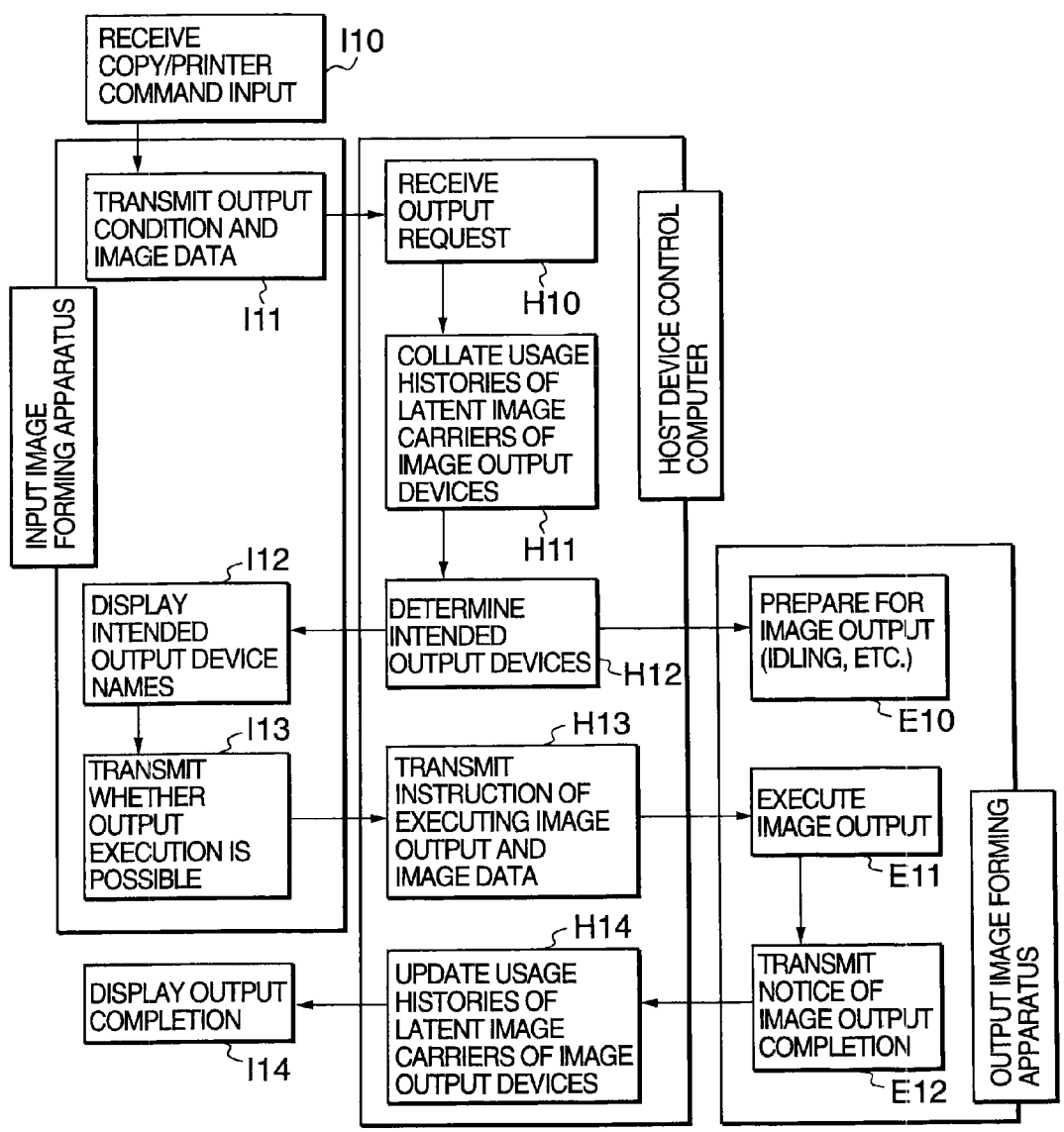
FIG. 5 is a flowchart showing an example of an output procedure in an image forming system according to an embodiment of the present invention.

The following describes a procedure for an output with the aforementioned image forming system by referring to FIG. 5.

One of the image forming apparatuses obtains image data by reading it from a scanner, determines output conditions (print settings, etc.), and starts an output operation (step I10). At that time, a user can set the output conditions by means of the operating unit 140 in the image forming apparatus 1. In addition, the user can select whether to enable the output. The output processing is started upon receiving these command inputs and manually or automatically giving an instruction of executing the output. The input image forming apparatus having started the output processing transmits the above output condition data and image data to the host device control computer 30 (step I11). The host device control computer 30, which has received the data via the LAN interface 30a, receives an output request (step H10) and collates usage histories of latent image carriers of the respective image forming apparatuses (step H11). If the image forming apparatuses are color output devices, the collation of the usage histories can be intended for latent image carriers for a specific color or it is possible to reference average data of a plurality of latent image carriers.

The host device control computer 30 can make inquires about the usage histories of the image forming apparatuses each time therewith and they can respond to the inquiries of the host device control computer. Otherwise, the host device control computer can manage the usage histories of the image forming apparatuses, store them in a nonvolatile memory, and read them out if necessary. The host device collates the above usage histories and selects image forming apparatuses intended for the output according to a predetermined standard (step H12). The standard can be, for example, a condition that the usage histories are approximately the same in the image forming apparatuses. After determining the intended output devices, the host device control computer sends a preparation request to the output image forming apparatuses, which are intended output devices. Upon receiving the preparation request, the image forming apparatuses intended for the output prepare for the image output such as idling (step E10). In addition, with the determination of the intended output devices, the host device control computer transmits information on the intended output devices to the input image forming apparatus. The input image forming apparatus displays the intended output device names on the touch panel 141 of the operating unit 140 by means of the apparatus control CPU 101, which has received the information on the intended output devices (I12). Furthermore, it awaits an input of an instruction of executing the output with the display (step I13). If the execute instruction is input during the awaiting, the execute instruction is sent to the host device control computer. It is also possible to make an arrangement that the user can select a part of the image forming apparatuses required for the output out of the intended output devices in the input of the execute instruction.

If the execute instruction is not input or the output is canceled in the above step I13, the series of procedure is terminated. Furthermore, it is also possible to cause an execute instruction to be automatically made directly or under conditions that no input has been made for a given period of time or other conditions in step I13. Having received the above output execute instruction, the host device control computer 30 further transmits an instruction of executing the image output, the image data to be output, and the output conditions to the intended output devices (selected intended devices if the input image forming apparatus selects a part of the image forming apparatuses) (step H13). Upon receiving the execute instruction, the image data, and the output conditions, the output image forming apparatuses execute the image output according to the image data and the output conditions (step E11). Completing the image output, the output image forming apparatuses transmit a notice of the completion to the host device control computer (step E12).

Upon receiving the notice of the output completion, the host device control computer updates the usage histories of the latent image carriers of the image forming apparatuses having completed the image output. If the host device control computer retains the usage history data, it updates the data. If each image forming apparatus retains the usage history data, the host device control computer sends a request for updating to the image forming apparatus. Otherwise, when the above image output is completed, the output image forming apparatuses can update the usage histories without receiving the request from the host device control computer. After the completion of the image output, the host device control computer further transmits a notice of the completion to the input image forming apparatus. Upon receiving the notice, the input image forming apparatus displays an indication of the output completion on the display unit such as the touch panel or the like (step I14).

(Output Procedure 2)

Figure 6:
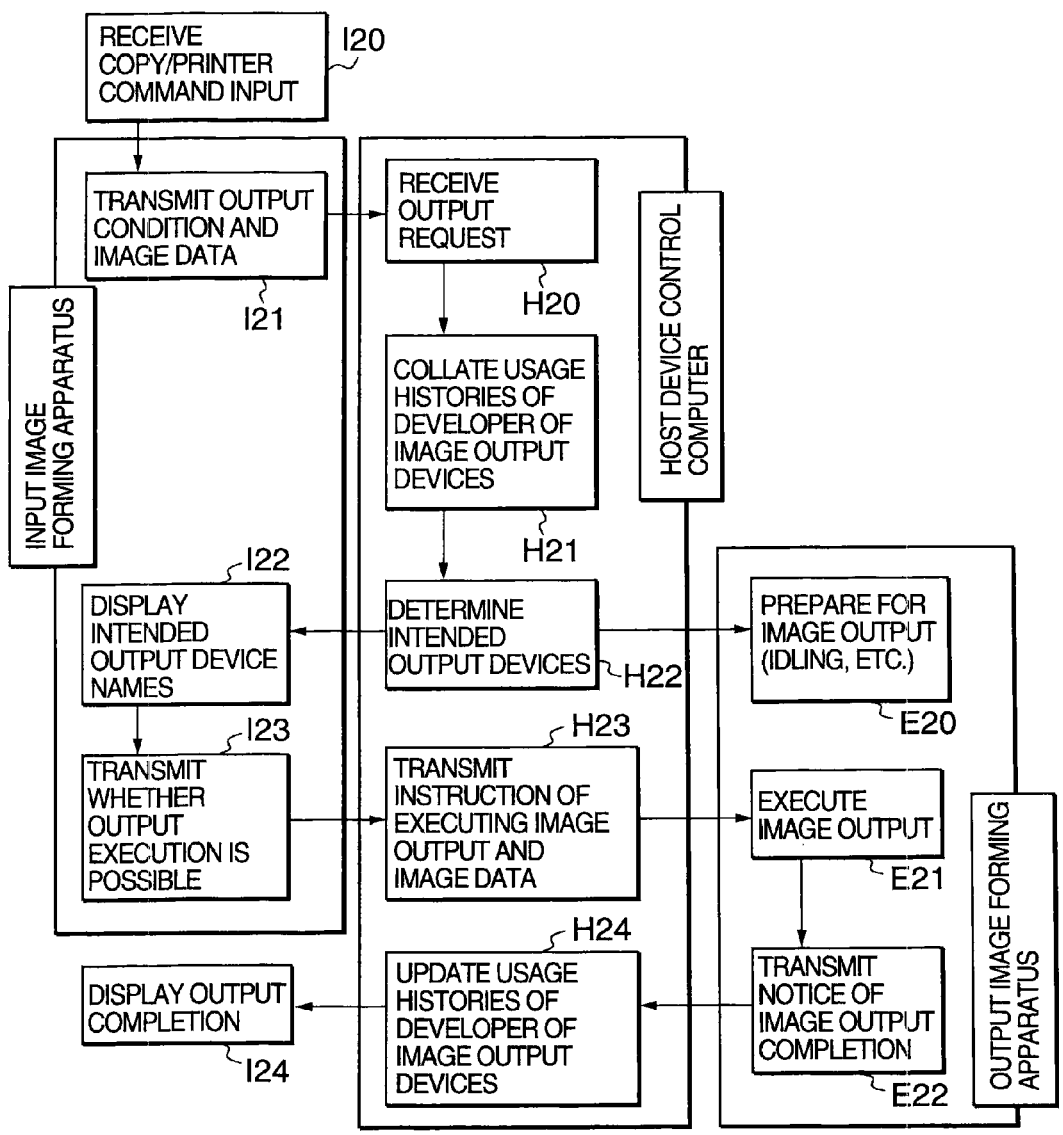
FIG. 6 is a flowchart showing an example of an output procedure in an image forming system according to another embodiment of the present invention.

The following describes another procedure for an output with the image forming system by referring to FIG. 6.

The input image forming apparatus obtains image data, determines output conditions (print settings, etc.), and starts the output (step I20). In the same manner as for the above procedure, a user can set the output conditions or select whether to enable the output at that time. The output processing is started upon receiving these command inputs and manually or automatically giving an instruction of executing the output. The input image forming apparatus having started the output processing transmits the above output condition data and image data to the host device control computer 30 (step I21). The host device control computer 30, which has received the data, receives an output request (step H20) and collates usage histories of developer of the respective image forming apparatuses (step H21). If the image forming apparatuses are color output devices, the collation of the usage histories can be intended for developer of a specific color or it is possible to reference average data of developer of a plurality of colors.

The host device control computer 30 can collect the usage histories of the developer of the respective image forming apparatuses by inquiring of the image forming apparatuses each time or can store and manage the usage histories of the developer of the image forming apparatuses. The host device collates the usage histories of the developer and selects image forming apparatuses intended for the output according to a predetermined standard (step H22). The standard can be, for example, a condition that the usage histories of the developer are approximately the same in the image forming apparatuses. After determining the intended output devices, the host device control computer sends a preparation request to the output image forming apparatuses, which are intended output devices. Upon receiving the preparation request, the image forming apparatuses intended for the output prepare for the image output (step E20). Furthermore, with the determination of the intended output devices, the host device control computer transmits information on the intended output devices to the input image forming apparatus. The input image forming apparatus displays the intended output device names on the touch panel 141 (I22). Furthermore, it awaits an input of an instruction of executing the output with the display (step I23). If the execute instruction is input during the awaiting, the execute instruction is transmitted to the host device control computer. It is also possible to make an arrangement that the user can select a part of the image forming apparatuses required for the output out of the intended output devices in the input of the execute instruction.

Furthermore, it is also possible to cause an execute instruction to be automatically made in step I23. Having received the above execute instruction for the output, the host device control computer 30 further transmits an instruction of executing the image output, the image data to be output, and the output conditions to the intended output devices (selected intended devices if the input image forming apparatus selects a part of the image forming apparatuses) (step H23). Upon receiving the execute instruction, the image data, and the output conditions, the output image forming apparatuses execute the image output according to the image data and the output conditions (step E21). Completing the image output, the output image forming apparatuses transmit a notice of the completion to the host device control computer (step E22).

Upon receiving the notice of the output completion, the host device control computer updates usage histories of the developer of the image forming apparatuses having completed the image output. If the host device control computer retains the usage history data, it updates the data. If each image forming apparatus retains the usage history data, the host device control computer sends a request for updating to each image forming apparatus. Otherwise, when the above image output is completed, the output image forming apparatuses can update the usage histories of the developer without receiving the request from the host device control computer.

The usage history of the developer is automatically or manually reset by replacement of the developing device provided as a unit. For example, a target image forming apparatus resets the usage history. If the host device control computer manages usage histories, the image forming apparatus whose developing device was replaced transmits a reset instruction to the host device control computer so that it can manage the usage histories appropriately.

After the completion of the image output, the host device control computer further transmits a notice of the completion to the input image forming apparatus. Upon receiving the notice, the input image forming apparatus displays an indication of the output completion on the touch panel or other display units (step I24).

(Output Procedure 3)

Figure 7:
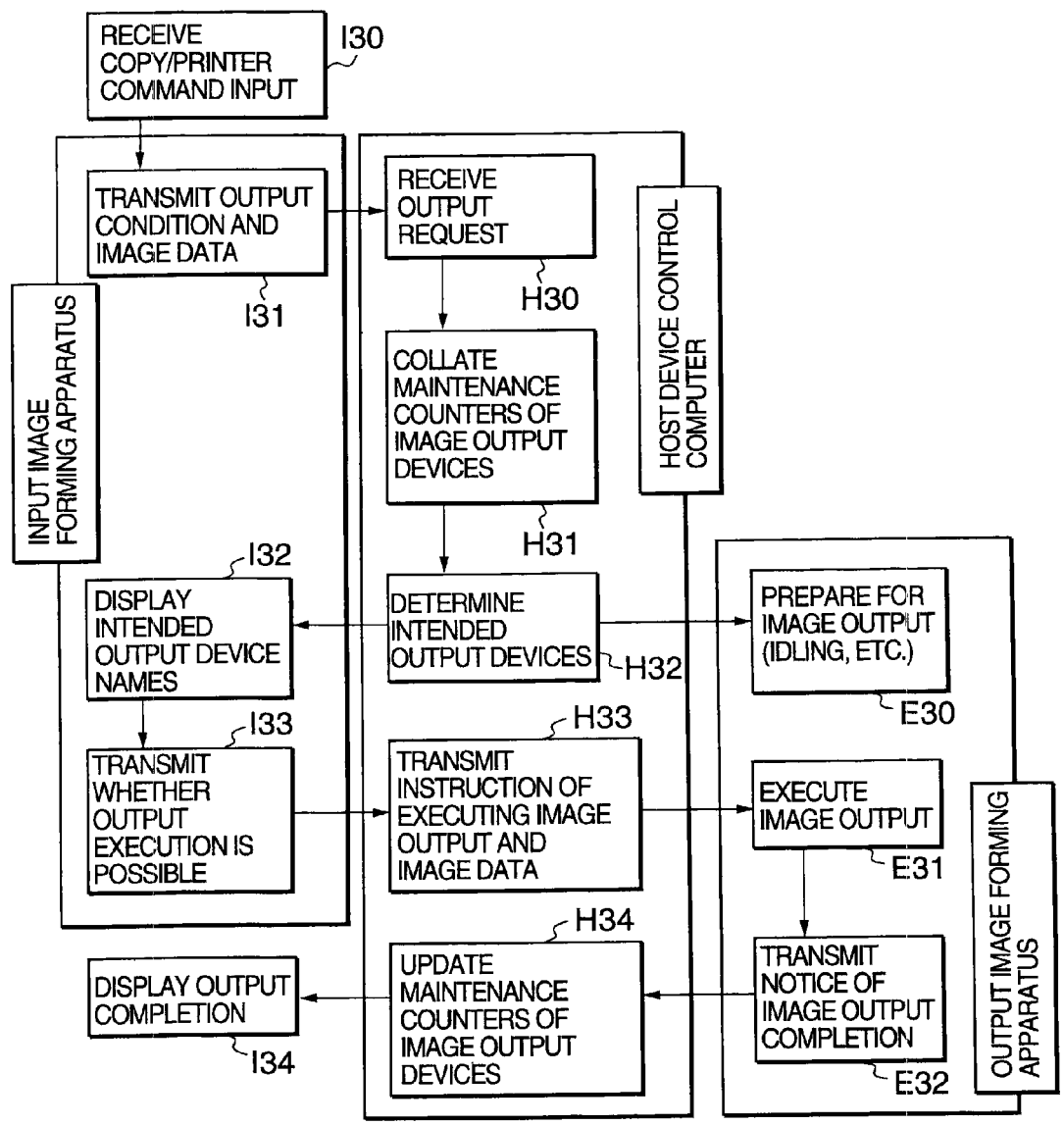
FIG. 7 is a flowchart showing an example of an output procedure in an image forming system according to still another embodiment of the present invention.

The following describes still another procedure for an output with the image forming system by referring to FIG. 7.

The input image forming apparatus obtains image data, determines output conditions (print settings, etc.), and starts the output (step I30). In the same manner as for the above procedure, a user can set the output conditions or select whether to enable the output at that time. The output processing is started upon receiving these command inputs and manually or automatically giving an instruction of executing the output. The input image forming apparatus having started the output processing transmits the above output condition data and image data to the host device control computer 30 (step I31). The host device control computer 30, which has received the data, receives an output request (step H30) and collates usage histories (maintenance counters in this embodiment) of the respective image forming apparatuses after maintenance (step H31). The maintenance counter indicates the number of output sheets of recording materials after the maintenance, and the counter value is reset to zero by carrying out the maintenance.

The host device control computer 30 can collect the maintenance counter data of the respective image forming apparatuses by inquiring of the image forming apparatuses each time or can store and manage the maintenance counter data of the image forming apparatuses. The host device collates the maintenance counter data and selects image forming apparatuses intended for the output according to a predetermined standard (step H32). The standard can be, for example, a condition that the maintenance counters indicate approximately the same value in the image forming apparatuses. Otherwise, the standard can be a condition that the maintenance counters of the image forming apparatuses indicate various values, in other words, that the maintenance works do not concentrate in the same period.

After determining the intended output devices, the host device control computer sends a preparation request to the output image forming apparatuses, which are intended output devices. Upon receiving the preparation request, the image forming apparatuses intended for the output prepare for the image output (step E30). In addition, with the determination of the intended output devices, the host device control computer transmits information on the intended output devices to the input image forming apparatus. The input image forming apparatus displays the intended output device names on the touch panel 141 (I32). Furthermore, it awaits an input of an instruction of executing the output with the display (step I33). If the execute instruction is input during the awaiting, the execute instruction is transmitted to the host device control computer. It is also possible to make an arrangement that the user can select a part of the image forming apparatuses required for the output out of the intended output devices in the input of the execute instruction.

Furthermore, it is also possible to cause an execute instruction to be automatically made in step I33. Having received the above execute instruction for the output, the host device control computer 30 further transmits an instruction of executing the image output, the image data to be output, and the output conditions to the intended output devices (selected intended devices if the input image forming apparatus selects a part of the image forming apparatuses) (step H33). Upon receiving the execute instruction, the image data, and the output conditions, the output image forming apparatuses execute the image output according to the image data and the output conditions (step E31). Completing the image output, the output image forming apparatuses transmit a notice of the completion to the host device control computer (step E32).

Upon receiving the notice of the output completion, the host device control computer updates the maintenance counters of the image forming apparatuses having completed the image output. If the host device control computer retains the maintenance counter data, it updates the data. If each image forming apparatus retains the maintenance counter data, the host device control computer sends a request for updating to each image forming apparatus. Otherwise, when the above image output is completed, the output image forming apparatuses can update the maintenance counters without receiving the request from the host device control computer.

The maintenance counter is reset at the maintenance carried out by a service person. For example, a target image forming apparatus resets the maintenance counter. If the host device control computer manages the maintenance counters, the image forming apparatus whose maintenance was finished transmits a reset instruction to the host device control computer so that it can manage the usage histories appropriately.

After the completion of the image output, the host device control computer further transmits a notice of the completion to the input image forming apparatus. Upon receiving the notice, the input image forming apparatus displays an indication of the output completion on the display unit such as the touch panel or the like (step I34).

(Output Procedure 4)

Figure 8:
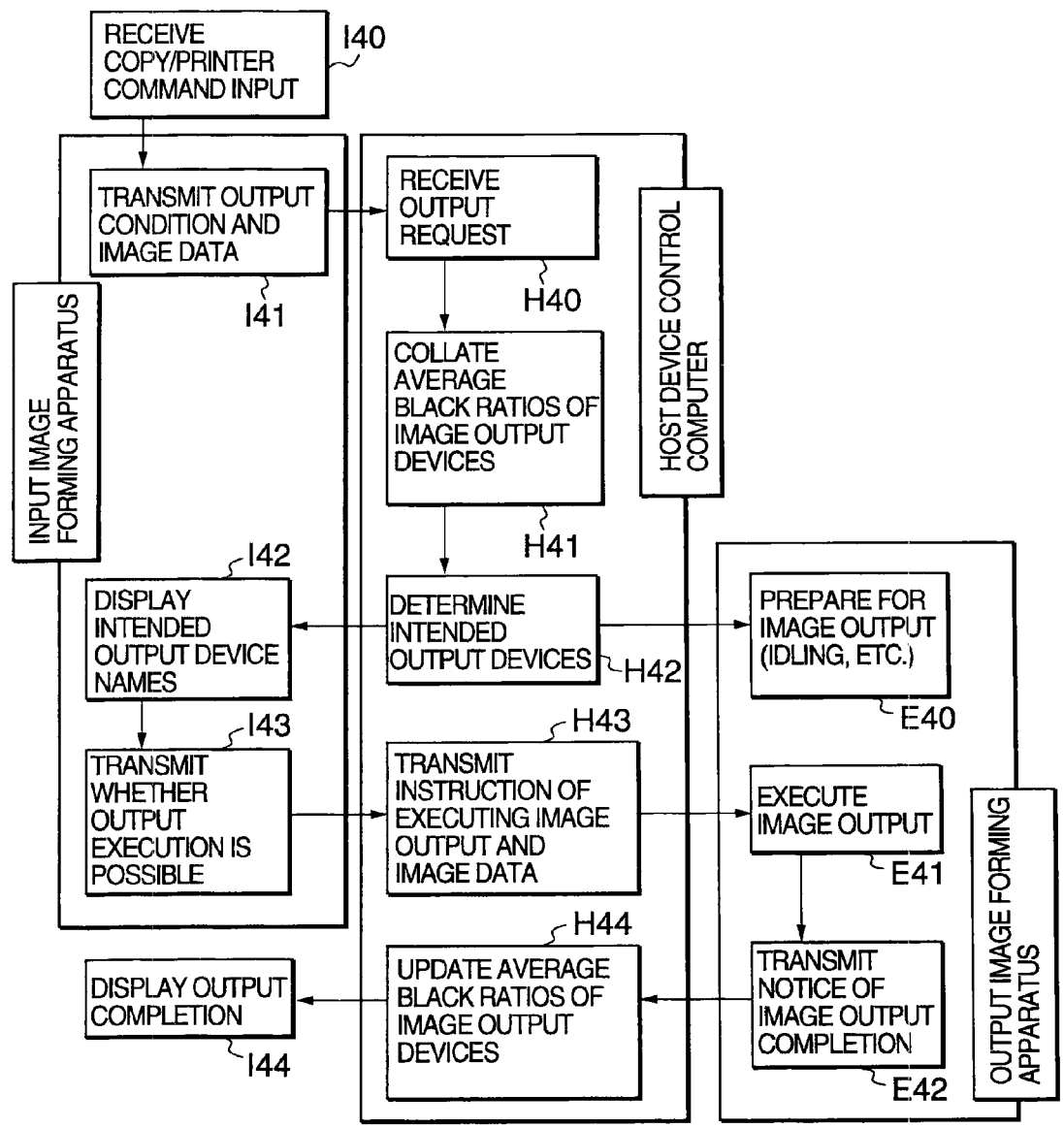
FIG. 8 is a flowchart showing an example of an output procedure in an image forming system according to still another embodiment of the present invention.

The following describes still another procedure for an output with the image forming system by referring to FIG. 8.

The input image forming apparatus obtains image data, determines output conditions, and starts the output (step I40). In the same manner as for the above procedure, a user can set the output conditions or select whether to enable the output at that time. The output processing is started upon receiving these command inputs and manually or automatically giving an instruction of executing the output. The input image forming apparatus having started the output processing transmits the above output condition data and image data to the host device control computer 30 (step I41). The host device control computer 30, which has received the data, receives an output request (step H40) and collates average photographic densities of the respective image forming apparatuses (step H41). A black ratio is defined as a ratio of an area of a toner image to an area of an entire sheet. The average black ratio indicates an average of photographic densities after starting to use the developer in the developing device provided as a unit. The black ratio depends upon image data. Therefore, the average black ratio is calculated every time an image is output. If the image forming apparatuses are color output devices, the calculation of the average photographic densities can be intended for developer of a specific color or it is possible to reference average data of developer of a plurality of colors.

The host device control computer 30 can collect the information on the average photographic densities of the image forming apparatuses by inquiring of the image forming apparatuses each time or can store and manage the information on the average photographic densities of the image forming apparatuses. The host device collates the average photographic densities and selects image forming apparatuses intended for the output according to a predetermined standard (step H42). The standard can be, for example, a condition that the average photographic densities are approximately the same in the image forming apparatuses. In this case, the image forming apparatuses for the output are selected by calculating the black ratio of the image data intended for the image output and calculating the average black ratio after outputting the image based on an average black ratio of an already output image.

After determining the intended output devices, the host device control computer sends a preparation request to the output image forming apparatuses, which are intended output devices. Upon receiving the preparation request, the image forming apparatuses intended for the output prepare for the image output (step E40). In addition, with the determination of the intended output devices, the host device control computer transmits information on the intended output devices to the input image forming apparatus. The input image forming apparatus displays the intended output device names on the touch panel 141 (I42). Furthermore, it awaits an input of an instruction of executing the output with the display (step I43). If the execute instruction is input during the awaiting, the execute instruction is transmitted to the host device control computer. It is also possible to make an arrangement that the user can select a part of the image forming apparatuses required for the output out of the intended output devices in the input of the execute instruction.

Furthermore, it is also possible to cause an execute instruction to be automatically made in step I43. Having received the above execute instruction for the output, the host device control computer 30 further transmits an instruction of executing the image output, the image data to be output, and the output conditions to the intended output devices (selected intended devices if the input image forming apparatus selects a part of the image forming apparatuses) (step H43). Upon receiving the execute instruction, the image data, and the output conditions, the output image forming apparatuses execute the image output according to the image data and the output conditions (step E41). Completing the image output, the output image forming apparatuses transmit a notice of the completion to the host device control computer (step E42).

Upon receiving the notice of the output completion, the host device control computer updates the information on the average photographic densities of the image forming apparatuses having completed the image output. If the host device control computer retains the information on the average photographic densities, it updates the data. If each image forming apparatus retains the information on the average photographic densities, the host device control computer sends a request for updating to each image forming apparatus. Otherwise, when the above image output is completed, the output image forming apparatuses can update the information on the average photographic densities without receiving the request from the host device control computer.

The information on the average black ratio is reset at replacement of the developing device provided as a unit. For example, a target image forming apparatus resets the information on the average black ratio. If the host device control computer manages the information on the average photographic densities, the image forming apparatus whose developing device has been replaced transmits a reset instruction to the host device control computer so that it can manage the usage histories appropriately.

After the completion of the image output, the host device control computer further transmits a notice of the completion to the input image forming apparatus. Upon receiving the notice, the input image forming apparatus displays an indication of the output completion on the display unit such as the touch panel or the like (step I44).

(Output Procedure 5)

Figure 9:
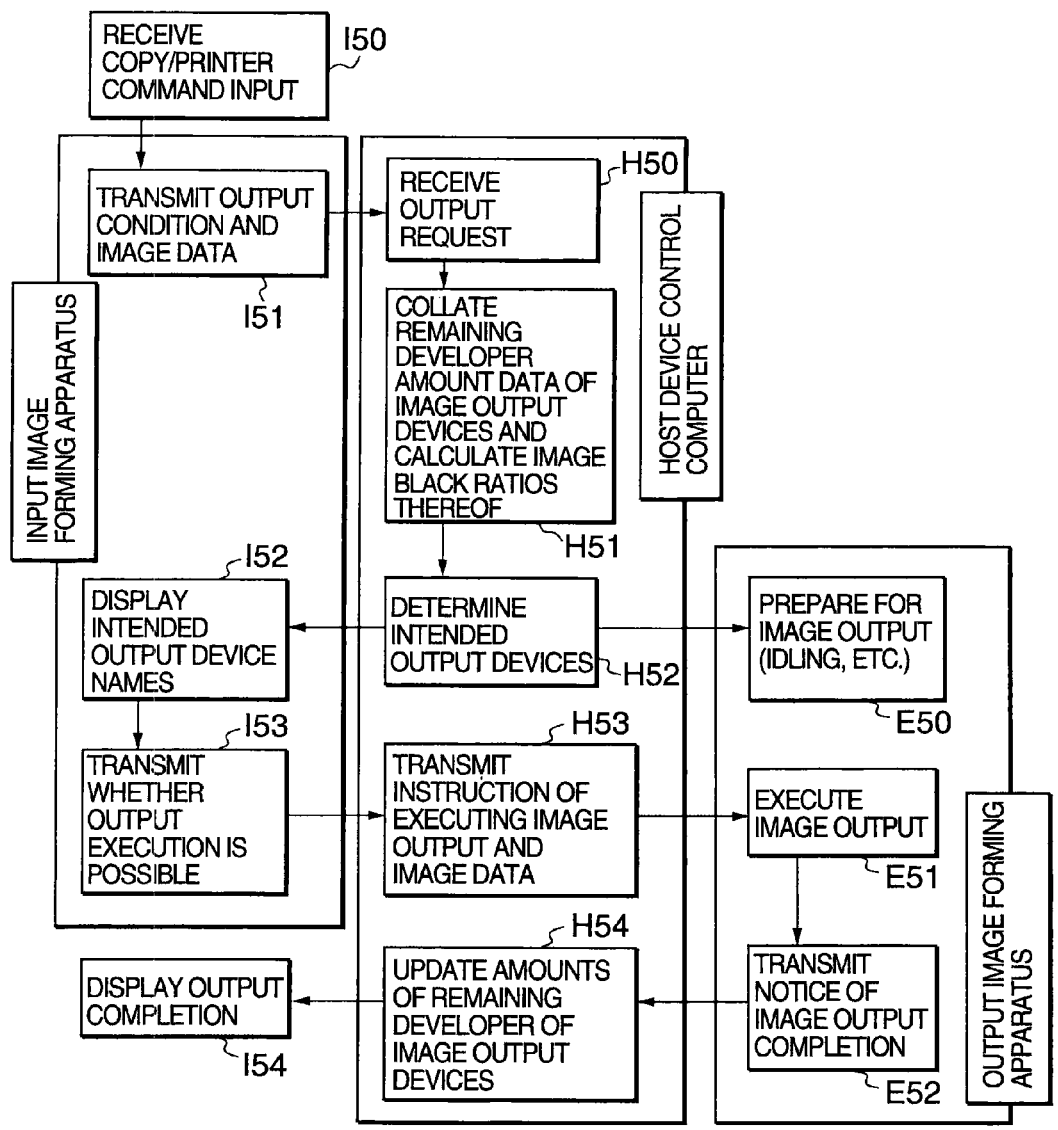
FIG. 9 is a flowchart showing an example of an output procedure in an image forming system according to still another embodiment of the present invention.

The following describes still another procedure for an output with the image forming system by referring to FIG. 9.

The input image forming apparatus obtains image data, determines output conditions, and starts the output (step I50). In the same manner as for the above procedure, a user can set the output conditions or select whether to enable the output at that time. The output processing is started upon receiving these command inputs and manually or automatically giving an instruction of executing the output. The input image forming apparatus having started the output processing transmits the above output condition data and image data to the host device control computer 30 (step I51). The host device control computer 30, which has received the data, receives an output request (step H50) and collates amounts of remaining developer of the respective image forming apparatuses (step H51). Furthermore, it calculates the black ratio of the image data in this procedure and predicts an amount of consumed developer. If the image forming apparatuses are color output devices, the calculation of the photographic densities and the collation of the amounts of remaining developer can be intended for developer of a specific color or it is possible to reference average data of developer of a plurality of colors.

The host device control computer 30 can collect the information on the amount of remaining developer of each image forming apparatus by inquiring of the image forming apparatus each time or can store and manage data of the amount of remaining developer of each respective image forming apparatus using the host device control computer. The host device collates the amounts of remaining developer and selects image forming apparatuses intended for the output according to a predetermined standard (step H52). The standard can be, for example, a condition that the amounts of remaining developer after consumption are approximately the same in the image forming apparatuses. Depending upon the amounts of remaining developer, it is possible to cause an image forming apparatus having a small amount of remaining developer to be selected preferentially so that the developer is used up. Furthermore, it is possible to predict an amount of consumed developer based on the calculated black ratio of the image data and the number of output sheets and then to set different selection standards for the selected image forming apparatuses according the predicted amount of consumed developer (for example, a large or small amount). For example, if a large amount of developer is to be consumed, high-speed machines or machines each having a large amount of remaining developer are selected.

After determining the intended output devices, the host device control computer sends a preparation request to the output image forming apparatuses, which are intended output devices. Upon receiving the preparation request, the image forming apparatuses intended for the output prepare for the image output (step E50). In addition, with the determination of the intended output devices, the host device control computer transmits information on the intended output devices to the input image forming apparatus. The input image forming apparatus displays the intended output device names on the touch panel 141 (I52). Furthermore, it awaits an input of an instruction of executing the output with the display (step I53). If the execute instruction is input during the awaiting, the execute instruction is transmitted to the host device control computer. It is also possible to make an arrangement that the user can select a part of the image forming apparatuses required for the output out of the intended output devices in the input of the execute instruction.

Furthermore, it is also possible to cause an execute instruction to be automatically made in step I53. Having received the above execute instruction for the output, the host device control computer 30 further transmits an instruction of executing the image output, the image data to be output, and the output conditions to the intended output devices (selected intended devices if the input image forming apparatus selects a part of the image forming apparatuses) (step H53). Upon receiving the execute instruction, the image data, and the output conditions, the output image forming apparatuses execute the image output according to the image data and the output conditions (step E51). Completing the image output, the output image forming apparatuses transmit a notice of the completion to the host device control computer (step E52).

Upon receiving the notice of the output completion, the host device control computer updates the remaining developer amount data of the image forming apparatuses having completed the image output. If the host device control computer retains the remaining developer amount data, it updates the data. If each image forming apparatus retains the remaining developer amount data, the host device control computer sends a request for updating to each image forming apparatus. Otherwise, when the above image output is completed, the output image forming apparatuses can update the remaining developer amount data without receiving the request from the host device control computer.

The remaining developer amount data is reset at replacement of the developing device provided as a unit. For example, a target image forming apparatus resets the remaining developer amount data. If the host device control computer manages the remaining developer amount data, the image forming apparatus whose developing device has been replaced transmits a reset instruction to the host device control computer so that it can manage the remaining developer amount data appropriately.

After the completion of the image output, the host device control computer further transmits a notice of the completion to the input image forming apparatus. Upon receiving the notice, the input image forming apparatus displays an indication of the output completion on the display unit such as the touch panel or the like (step I54).

The present invention has been described hereinabove in connection with certain preferred embodiments.

According to the first aspect of the invention, the output image forming apparatuses can be selected based on the usage history of a latent image carrier of each image forming apparatus. Therefore, output destinations can be determined according to conditions of the image forming apparatuses different in frequency of use of their latent image carriers, thereby preventing a variance of an image quality caused by differences in conditions of the latent image carriers of the image forming apparatuses.

The latent image carrier generally comprises a photosensitive drum with an OPC, Se, or other photosensitive layer formed on its surface. In the latent image carrier, a latent image is formed on a uniformly charged surface by means of a laser beam. The latent image is developed using developer and transferred to a recording material such as paper. Thereafter, the latent image carrier is cleaned to remove remaining toner for a preparation for the next latent image. The above operation is repeated in the latent image carrier. Therefore, its characteristic is gradually deteriorated by the repetitive use inevitably. The present invention enables the standardization of image qualities of the respective image forming apparatuses by considering the deterioration of the latent image carriers through use thereof.

In the present invention, the selection standard for the image forming apparatuses based on the usage histories is, for example, a condition that the usage histories of the latent image carriers of the image forming apparatuses are approximately the same. It is also possible to prevent a variance of an output quality by selecting image forming apparatuses having similar usage histories.

If it is aimed to have approximately the same usage histories of the latent image carriers of the image forming apparatuses, output destinations can be selected so that the usage histories are gradually converged on approximately the same conditions through a plurality of jobs, even if the usage histories of the image forming apparatuses are not approximately the same at an output in a single job. By repeating the selection of the image forming apparatuses through the plurality of jobs, approximately the same usage histories can be generated in the image forming apparatuses. The standard for the usage histories of the latent image carriers has only to be common in the image forming apparatuses, but it is not limited to specific one. The standard can be the operating time of the latent image carriers or the number of sheets to which an image is printed (transferred) based on a recording material. In other words, it only has to be useful for evaluating the characteristic of the latent image carrier deteriorating through use.

The usage history of the latent image carrier is intended for a specific carrier. For example, the usage history is reset at replacement of the latent image carrier. There is a method of the reset in which a service person manually resets the usage history at the replacement of the carrier or in which a fuse for detecting NEW is previously attached to, for example, the latent image carrier to detect it automatically in the image forming apparatus.

In some cases, the latent image carriers of the image output devices show various processes of performance changes (deterioration) through use due to differences of individual characteristics. Therefore, it is preferable to grasp the characteristic changes of the individual latent image carriers previously and to select image output devices based on the usage histories after consideration of the characteristic changes. For example, it is assumed that a latent image carrier a0 of an image output device A has a double tolerance for characteristic changes based on the usage history in comparison with a latent image carrier b0 of an image output device B. Supposing that the latent image carrier a0 has a usage history of 15,000 sheets and the latent image carrier b0 has a usage history of 10,000 sheets when the image output device A receives a copy/printer command, the number of sheets as the usage history of the latent image carrier b0 is lower than that of the latent image carrier a0. Since the latent image carrier a0 has a double tolerance for characteristic changes based on the usage history, however, the characteristic of the latent image carrier a0 is equivalent to 7,500 sheets (15,000 sheets divided by 2) in the characteristic of the latent image carrier b0. Therefore, it is preferable to select the image output device A in terms of an output quality in this case. While the above example is illustrative only, as stated above it is possible to keep the latent image carriers in approximately the same condition among the image output devices by grasping various characteristic changes of the latent image carriers for each model that may occur in connected different models and giving feedback to the selection of the image output devices, thereby achieving similar output qualities even if the image forming apparatuses have different functions. Additionally, in the above condition, the usage history of each latent image carrier can be modified based on the characteristic of deterioration through use of each latent image carrier. For example, a modified usage history is derived from a usage history not modified by showing a data table of a relation between the usage history not modified before consideration of a characteristic difference between the latent image carriers and the modified usage history, making a graph of the relation, or defining a coefficient thereof. By selecting image forming apparatuses to which an image is output based on the modified usage histories, apparatuses more suitable for actual conditions can be selected.

Subsequently, according to the fifth aspect of the invention, output image forming apparatuses are selected based on usage histories of developer in respective image forming apparatuses. Therefore, output destinations can be determined according to conditions of the image forming apparatuses different in frequency of use of their developer, thereby preventing a variance of an image quality caused by differences in conditions of the developer of the image forming apparatuses.

The developer mainly comprises toner with plasticizer added if necessary. It is used for visualizing a latent image on the latent image carrier and is transferred as a toner image to a recording material as mentioned above. After the transfer, remaining toner on the latent image carrier is collected by cleaning and can be reused. Generally the developing device contains the developer, and a required amount of developer is supplied from the developer to the latent image carrier by means of a developer conveying unit provided in the developing device. If the toner collected by cleaning is reused, the collected toner is returned into the developing device. As mentioned above, the developer is gradually deteriorated by the developer conveying unit staying in the operating developing device or through reuse of the developer inevitably. The present invention enables the standardization of image qualities of the respective image forming apparatuses by considering the deterioration of the developer through use thereof.

The selection standard for the image forming apparatuses based on the usage histories is, for example, a condition that the usage histories of the developer of the image forming apparatuses are approximately the same. Otherwise, it is possible to prevent a variance of an output quality by selecting image forming apparatuses having similar usage histories.

If it is aimed to have approximately the same usage histories of the developer of the image forming apparatuses, output destinations can be selected so that the usage histories of the developer of the image forming apparatuses are approximately the same in an output in a single job, or they can be selected in such a way that the usage histories are gradually converged on approximately the same conditions. The standard for the usage histories of the developer has only to be common in the image forming apparatuses, but it is not limited to specific one. The standard can be the operating time of the developing device or the number of sheets to which an image is printed based on a recording material. In other words, it only has to be useful for evaluating the characteristic of the developer deteriorating through use.

The usage history of the developer is intended for a specific developer. In many cases, developer is packaged with a developing device and the package is replaced when it is supplied in general. Therefore, the usage history is reset at replacement of developer. There is a method of the reset in which a service person manually resets the usage history at the replacement of the developer or in which a fuse for detecting NEW is previously attached to, for example, the developing device to detect it automatically in the image forming apparatus.

Furthermore, the developer of the image output devices shows various processes of performance changes (deterioration) depending on the usage history due to differences of individual characteristics. Therefore, it is preferable to grasp the characteristics of the developer in advance and to select image output devices based on the usage histories after consideration of the characteristic changes. For example, it is assumed that developer a1 of an image output device A has a double tolerance for characteristic changes based on the usage history in comparison with developer b1 of an image output device B. Supposing that the developer a1 has a usage history of 15,000 sheets and the developer b1 has a usage history of 10,000 sheets when the image output device A receives a copy/printer command, the number of sheets as the usage history of the developer b1 is lower than that of the developer a1. Since the developer a1 has a double tolerance for characteristic changes based on the usage history, however, the characteristic of the developer a1 is equivalent to 7,500 sheets (15,000 sheets divided by 2) in the characteristic of the developer b1. Therefore, it is preferable to select the image output device A in terms of an output quality in this case. While the above example is illustrative only, as set forth above it is possible to keep the developer in approximately the same condition among the image output devices by grasping various characteristic changes of the developer for each model that may occur in connected different models and giving feedback to the selection of the image output devices, thereby achieving similar output qualities even if the image forming apparatuses have different functions. In the above condition, the usage history of the developer can be modified based on the characteristic of deterioration through use of the developer. For example, a modified usage history is derived from a usage history not modified by showing a data table of a relation between the usage history not modified before consideration of a characteristic difference of the developer and the modified usage history, making a graph of the relation, or defining a coefficient thereof. By selecting image forming apparatuses to which an image is output based on the modified usage histories, apparatuses more suitable for actual conditions can be selected.

Furthermore, according to the ninth aspect of the invention, output image forming apparatuses are selected based on usage histories after maintenance in respective image forming apparatuses. Therefore, output destinations can be determined according to conditions of the image forming apparatuses depending on maintenance, thereby preventing a variance of an image quality caused by differences in conditions of the image forming apparatuses.

In an image forming apparatus, an output quality gradually deteriorates due to dirt or faulty adjustment of a mechanical system in a latent image carrier such as the aforementioned one, a laser beam optical system for forming a latent image on the latent image carrier, a fixing device for fixing toner by heating a recording material to which a toner image is transferred, and a reading unit for reading an original through continuous use of the apparatus. Therefore, most image forming apparatuses receive regular maintenance services (cleaning, mechanical adjustment, etc.) conducted by a service person. The maintenance keeps the output quality in a good condition. Thereafter, the characteristic is supposed to deteriorate gradually due to the gathering of dirt through continuous use. Therefore, the condition of an image forming apparatus can be known by grasping its usage history after the maintenance. The present invention enables the standardization of image qualities or more efficient maintenance of the respective image forming apparatuses by considering the usage histories after maintenance.

Furthermore, it is possible to distribute the maintenance cycles of the output image forming apparatuses intentionally in such a way that maintenance cycles of the respective models do not concentrate in the same period. If the maintenance cycles concentrate in the same period, there may be a plurality of unavailable image output devices under maintenance or characteristics of all image output devices may change after maintenance, thereby causing a noticeable change of the image characteristics. In this manner, the maintenance cycles in the system can be set so as to come into the same period or be distributed intentionally according to the characteristic changes of the models or the environment for use, thereby keeping optimum images appropriate for individual usage.

The selection standard for the image forming apparatuses based on the usage histories can be, for example, the operating time or the number of printed sheets based on the recording material of the image forming apparatuses. In other words, it only has to be useful for evaluating the characteristics of the image forming apparatuses deteriorating through use.

The usage history begins with a start of individual maintenance. Therefore, the usage history need be reset every time the maintenance is carried out. It can be reset by a service person manually at the maintenance. Otherwise, it can be automatically reset at a detection of an execution of the maintenance.

Furthermore, the image output devices show various processes of performance changes (deterioration) depending on the usage histories due to differences of individual characteristics, thereby causing various maintenance cycles. Therefore, it is preferable to grasp the characteristics of the characteristics of deterioration through use of the image forming apparatuses in advance and to select image output devices based on the usage histories after consideration of the characteristic changes. This consideration enables a user to achieve the similar output qualities even if the image forming apparatuses are different in functions. For example, it is assumed that a maintenance cycle A of an image output device A is twice as longer as a maintenance cycle B of an image output device B. Supposing that the image output device A has a usage history of 200,000 sheets after maintenance and the image output device B has a usage history of 150,000 sheets after maintenance when the image output device A receives a copy/printer command, the number of sheets as the usage history after maintenance of the image output device B is lower than that of the image output device A. Since the maintenance cycle of the image output device A is twice as longer as that of the image output device B, however, the characteristic of the image output device A is equivalent to 75,000 sheets (150,000 sheets divided by 2) in the characteristic of the image output device B. Therefore, it is preferable to select the image output device A.

Furthermore, according to the 13th aspect of the invention, output image forming apparatuses are selected based on average photographic densities after replacements of developer. Therefore, output destinations can be determined according to conditions of the image forming apparatuses depending on the average photographic densities, thereby preventing a variance of an image quality caused by differences in conditions of the image forming apparatuses.

The black ratio is defined as a ratio of an area of a toner image to an area of the entire sheet. In the present invention, the average black ratio can be calculated from black ratio data after replacement of developer and a usage history of developer.

Information data about the average black ratio is reset at replacement of developer. There is a method of the reset in which a service person manually resets it at replacement of developer or in which a fuse for detecting NEW is previously attached to, for example, a latent image carrier so that it is automatically detected in the image forming apparatus.

In general, a high average black ratio indicates a large amount of consumed toner. Therefore, toner is exchanged frequently in a developing device. When toner remains in the developing device, it undergoes stress, thereby accelerating deterioration of toner. Therefore, as the average black ratio gets low, the characteristic changes becomes large. It is preferable to select image output devices so that the average photographic densities get close to the same value in the respective image output devices. For example, it is assumed that an image output device A has an average black ratio A of 15% and an image output device B has an average black ratio B of 30% when the image output device A receives a copy/printer command. If the command received by the image output device A indicates 30% or higher, it is preferable to select the image output device A. If it indicates 15% or lower, it is preferable to select the image output device B. If it indicates a value between 15 to 30%, the average photographic densities are approximately the same in the image output devices in either case, and therefore either can be selected.

Still further, according to the 16th aspect of the invention, output image forming apparatuses are selected based on amounts of remaining developer and a black ratio of image data in a job. Therefore, output destinations can be determined according to the amounts of remaining developer after consumption and the amounts of remaining developer of the image forming apparatuses can be controlled.

A high black ratio of an output image indicates a large amount of consumed toner. Therefore, it is possible to select image output devices based on the amounts of consumed toner and the amounts of remaining developer so as to prevent the frequency of toner bottle replacements by a user (or a service person) from being nonuniform in the image output devices. Otherwise, if it is preferable to select and use image output devices having less remaining developer preferentially, the selection is conducted. For example, if a black ratio of an output image is low and a small amount of image data is output, image output devices having less remaining developer are selected preferentially. By using image output devices having a large amount of remaining developer when a large number of image copies are output, it is possible to prevent a halt of the image output caused by a lack of supplied toner during image output operation. More preferably, a certain amount of remaining developer can be secured in favor of an image output device faster in an image output in preparation for a large amount of output.

As described above, by selecting image output devices based on the amount of remaining developer and the amount of consumed developer of each image output device, differences in performance of the image output devices can be effectively used.

The image forming apparatus for use in the image forming system of the present invention can be either of a black-and-white output device and a color output device. The color output device has developer including color particles.

In the present invention, it is possible to cause an image output automatically in selected image forming apparatuses if the image forming apparatuses are selected based on usage histories or the like for the output. Otherwise, a user can specify image forming apparatuses for an output out of the selected image forming apparatuses. When an image is output from selected image forming apparatuses or specified image forming apparatuses, the image can be output either automatically or after awaiting an execute instruction from a user.

If output image forming apparatuses are selected based on the usage histories or the like as mentioned above, it can be noticed of a user by displaying names of the selected image forming apparatuses on a display unit. In addition, the display facilitates the specification work at the above specification.

The image forming apparatuses can be selected by an image forming apparatus as a host device after allocating an image forming apparatus defined as a host device or an arbitrary image forming apparatus to a host device. Otherwise, the host device control computer is provided independently so that it can manage the image forming apparatuses.

Furthermore, all of the image forming apparatuses, which form the image forming system, can be of the same model. In addition, at least one image forming apparatus can be of a model different in functions from other image forming apparatuses.

As set forth hereinabove, according to an image forming system of the present invention, it comprises communication means for interconnection and a plurality of electrophotographic image forming apparatuses each visualizing a latent image on a latent image carrier generated based on input image data by means of developer and transferring it to a recording material, which are connected via the communication means, the image forming system having means for storing usage histories of the latent image carriers of the image forming apparatuses and having a function of selecting image forming apparatuses outputting the image based on the carrier usage history data stored in the storing means. Therefore, it becomes possible to achieve approximately the same output image qualities in the printers by managing the usage histories so as to keep approximately the same deteriorated conditions of the latent image carriers of the image forming apparatuses.

According to another image forming system of the present invention, it comprises communication means for interconnection and a plurality of electrophotographic image forming apparatuses each visualizing a latent image on a latent image carrier generated based on input image data by means of developer and transferring it to a recording material, which are connected via the communication means, the image forming system having means for storing usage histories of the developer of the image forming apparatuses and having a function of selecting image forming apparatuses outputting the image based on the developer usage history data stored in the storing means. Therefore, it becomes possible to achieve approximately the same output image qualities in the printers by managing the usage histories so as to keep approximately the same deteriorated conditions of the developer of the image forming apparatuses.

According to still another image forming system of the present invention, it comprises communication means for interconnection and a plurality of electrophotographic image forming apparatuses each visualizing a latent image on a latent image carrier generated based on input image data by means of developer and transferring it to a recording material, which are connected via the communication means, the image forming system having means for storing usage histories after maintenance of the image forming apparatuses and having a function of selecting image forming apparatuses outputting the image based on the aforementioned usage history data. Therefore, it becomes possible to achieve approximately the same output image qualities in the printers by managing the usage histories after maintenance so that maintenance cycles of the image forming apparatuses complete at approximately the same time. Furthermore, it has an advantage that the maintenance can be carried out at a time.

According to still another image forming system of the present invention, it comprises communication means for interconnection and a plurality of electrophotographic image forming apparatuses each visualizing a latent image on a latent image carrier generated based on input image data by means of developer and transferring it to a recording material, which are connected via the communication means, the image forming system having means for calculating and storing average photographic densities of developer after replacement and having a function of selecting image forming apparatuses outputting the image based on the average black ratio data stored in the storing means. Therefore, it becomes possible to achieve approximately the same output image qualities in the printers by calculating the average photographic densities of the printed image data of the developer from the usage histories of the developer and managing the average photographic densities.

According to still another image forming system of the present invention, it comprises communication means for interconnection and a plurality of electrophotographic image forming apparatuses each visualizing a latent image on a latent image carrier generated based on input image data by means of developer and transferring it to a recording material, which are connected via the communication means, the image forming system having means for detecting amounts of remaining developer of the image forming apparatuses and means for calculating a black ratio of the image data and having a function of selecting image forming apparatuses outputting the image based on the remaining developer amount data and the black ratio data. Therefore, it becomes possible to control the amounts of remaining developer to be approximately the same in the printers or to control one side of printers to consume a large amount of developer by managing the remaining developer amount data and the black ratio data.

What is claimed is:

1. An image forming system comprising:
   communication unit for interconnection; and
   a plurality of electrophotographic image forming apparatuses each visualizing a latent image on a latent image carrier generated based on input image data by a developer and transferring the visualized image to a recording material, which are connected via said communication unit;
   the image forming system having memory to store usage histories of the latent image carriers of the image forming apparatuses and having a function of controlling image forming apparatuses outputting the image based on the carrier usage history data stored in the memory to achieve approximately the same deteriorated conditions,
   wherein the usage history of said latent image carrier is modified according to a characteristic of deterioration through use of each latent image carrier.

2. The image forming system according to claim 1, wherein the usage history of said latent image carrier is based on the number of transferred pages obtained with reference to an operating time or recording materials.

3. The image forming system according to claim 1, wherein the image forming apparatuses outputting the image are selected so that the usage histories of the latent image carriers of the image forming apparatuses are approximately the same.

4. The image forming system according to claim 1, wherein the developer contains color particles.

5. The image forming system according to claim 1, wherein a part or all of the plurality of image forming apparatuses connected to each other via said communication unit are of different models.

6. The image forming system according to claim 1, further comprising a display unit for displaying a list of the image forming apparatuses selected for outputting the image.

7. The image forming system according to claim 6, further comprising an operating unit for giving an instruction to execute the output with specifying a part or all of the image forming apparatuses displayed on said display unit.

8. The image forming system according to claim 1, further comprising a host device control unit for selecting the image forming apparatuses outputting the image based on one of the data.

9. The image forming system according to claim 8, wherein said host device control unit is incorporated in at least one of the image forming apparatuses.

10. The image forming system according to claim 8, wherein said host device control unit is connected to said image forming apparatuses independently of the image forming apparatuses connected to each other.

11. An image forming system comprising:
communication unit for interconnection; and
a plurality of electrophotographic image forming apparatuses each visualizing a latent image on a latent image carrier generated based on input image data by a developer and transferring the visualized image to a recording material, which are connected via said communication unit;
the image forming system having memory to store developer usage histories data corresponding to a deterioration of a characteristic of the developer through use of the developer in the image forming apparatuses and having a function of controlling image forming apparatuses outputting the image based on the developer usage history data stored in the memory to achieve approximately the same deteriorated conditions,
wherein the usage history of the developer is modified according to a characteristic of deterioration through use of the developer.

12. The image forming system according to claim 11, wherein the usage history of the developer is based on the number of transferred pages obtained with reference to an operating time of a developing device, which contains the developer and supplies it to the latent image carrier, or recording materials.

13. The image forming system according to claim 11, wherein the image forming apparatuses outputting the image are selected so that the usage histories of the developer are approximately the same in the image forming apparatuses.

* * * * *